US012562035B2

(12) United States Patent
Wooi et al.

(10) Patent No.: US 12,562,035 B2
(45) Date of Patent: Feb. 24, 2026

(54) SYSTEM AND METHOD FOR AN ARCADE GAME MACHINE

(71) Applicants: Tan Chee Wooi, Markham (CA); Huang Zehang, Guangzhou (CN)

(72) Inventors: Tan Chee Wooi, Markham (CA); Huang Zehang, Guangzhou (CN)

( * ) Notice: Subject to any disclaimer, the term of this patent is extended or adjusted under 35 U.S.C. 154(b) by 290 days.

(21) Appl. No.: 18/337,334

(22) Filed: Jun. 19, 2023

(65) Prior Publication Data

US 2024/0339013 A1 Oct. 10, 2024

Related U.S. Application Data

(60) Provisional application No. 63/495,115, filed on Apr. 9, 2023.

(51) Int. Cl.
*G07F 17/32* (2006.01)

(52) U.S. Cl.
CPC ...... *G07F 17/3297* (2013.01); *G07F 17/3213* (2013.01); *G07F 17/3216* (2013.01); *G07F 17/3267* (2013.01)

(58) Field of Classification Search
None
See application file for complete search history.

(56) References Cited

U.S. PATENT DOCUMENTS 7,824,252 B1 * 11/2010 Kelly .................... A63F 7/0058 463/16
12,243,394 B2 * 3/2025 Wooi .................. G07F 17/3246
2009/0042653 A1 * 2/2009 Hamada .............. G07F 17/3297 463/42

* cited by examiner

*Primary Examiner* — Sunit Pandya
(74) *Attorney, Agent, or Firm* — Alexander Chen, Esq.

(57) ABSTRACT

A coin-operated arcade game method is disclosed in which a see-through game box presents both mechanical and virtual gameplay. A player deposits a coin through an external control panel, causing a graphical interface to display spinning left and right virtual wheels, virtual X signs, counters, and progress bars. A ball is released from storage through a hopper, detected by a sensor, and synchronized with the virtual interface. Prize outcomes occur when a virtual ball aligns with prize sectors of the virtual wheels. Bonus spin events trigger a larger bonus wheel superimposed on a virtual wheel, guaranteeing a prize such as tickets, balls, or a prize package. Physical balls and prize packages accumulate on a flat tray and are advanced by a sweeper, separating into a ball funnel and a prize pickup bin, thereby combining immersive visual gameplay with mechanical reward delivery.

3 Claims, 21 Drawing Sheets

SYSTEM AND METHOD FOR AN ARCADE GAME MACHINE

BACKGROUND OF THE INVENTION

Coin-based arcade game machines have come a long way since their early days. In the beginning, arcade games were simple and often used electromechanical technology. However, as technology has advanced, arcade games have become more complex and immersive. Today, arcade games feature state-of-the-art graphics, sound, and gameplay.

One of the most significant advances in arcade game technology has been the development of microprocessors. Microprocessors allow arcade games to be much more complex and interactive than they were in the past. This is because microprocessors can be programmed to perform complex calculations and operations. As a result, arcade games can now feature realistic graphics, complex physics, and challenging gameplay.

Another major advance in arcade game technology has been the development of high-definition displays. High-definition displays allow arcade games to produce stunning visuals that are simply not possible on older arcade machines. This is because high-resolution displays can display more pixels than older displays. As a result, arcade games can now look more realistic and immersive than ever before, and more enjoyable for players.

In addition to microprocessors and high-resolution displays, arcade game technology has also benefited from advances in sound technology. Sound technology allows arcade games to produce realistic sound effects and music. This helps to create a more immersive experience for players.

In addition to advances in technology, arcade game design has also evolved over time. Early arcade games were often simple and repetitive. However, modern arcade games are often designed to be more challenging and rewarding. This has made arcade games more appealing to a wider range of players.

As a result of these advances, coin-based arcade game machines have become a popular form of entertainment for people of all ages. Arcade games offer a unique and exciting experience that cannot be replicated at home. This is why arcades continue to be popular, even in the age of home consoles and computers.

Over time the microprocessors become ever more powerful and intelligent, and game designers and producers taking advantage of such microprocessor advances also advance their game design, which become ever more challenging. This invention will disclose a novel coin-based arcade game machine and its design, that push arcade game machine design further with its two-stage challenge design to keep its players engaged, and its intuitive graphical interface design for all ages.

SUMMARY OF THE INVENTION

A coin-operated arcade game system comprising a physical see-through game box, an external game control panel, an internal color game display, a hopper for ball dropping coupled with a hopper sensor for detecting said ball dropping, a flat tray, a sweeper, a ball funnel, an internal ball purveyor, a prize pickup bin, a microprocessor, a graphics processing unit (GPU), a memory component, a circuit board, an audio output device.

The game control panel further comprises a coin input device operable to accept a coin from a player at said game box. The color game display is operable to display a graphical interface of a gameplay in response to a coin input. The microprocessor, GPU, and circuit board, together, provide and control the gameplay, which comprises a graphical interface that in turn comprises a left virtual wheel and a right virtual wheel, a left virtual X sign and a right virtual X sign, a prize drop progress bar, a prize ticket counter, a ball counter, and a coin counter.

The game display displays the left and right virtual wheels spinning in response to the coin deposit, and the audio output device also plays a preconfigured tune.

The ball release control button is operable to release a ball down the hopper from the ball storage. The hopper is coupled with a hopper sensor that is operable to detect a ball drop and send a signal to the microprocessor. This microprocessor then commands the left and right virtual X signs to blink, and the left and right virtual wheels to send their sectors' data, including relative position to the left and right virtual X signs', respectively.

The microprocessor causes a prize win response in response to a prize win event when a sector of the left and right virtual wheels lines up with the left and right virtual X signs, respectively.

In one embodiment, the flat tray catch a ball after its exiting the hopper and a prize package after its drop from a prize package dispenser.

In another embodiment, the sweeper continuously pushes near balls that touch it toward the game box's front a preconfigured fixed distance. The near balls then in turn push distant balls that lie on the flat tray distant from the sweeper. When enough balls lie on the flat tray, the most distant balls are pushed off the edge of the flat tray into the ball funnel.

In another embodiment, the flat tray also catches a prize package and the sweeper also pushes it off the edge of the flat tray, like the balls. The prize package is pushed off into the prize pickup bin.

OBJECT OF THE INVENTION

It is an object of this invention to provide an modern arcade game machine with enticing sound and color lights.

It is an object of this invention to provide an modern arcade game machine with a challenging gameplay.

It is an object of this invention to provide an modern arcade game machine with a two-stage gameplay.

FIELD OF THE INVENTION

This invention relates to the coin-operated arcade game machine technology and design. Particularly, this invention relates to coin-operated two-stage gameplay arcade game machine.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network (such as the Internet) after the gaming machine or gaming device is in a gaming establishment.

In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player.

In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any base or primary wagering games are communicated from the central server to the gaming device in a thick client configuration and computerized instructions for controlling any bonus games or functions are executed by a central server in a thin client configuration.

Figure 1:
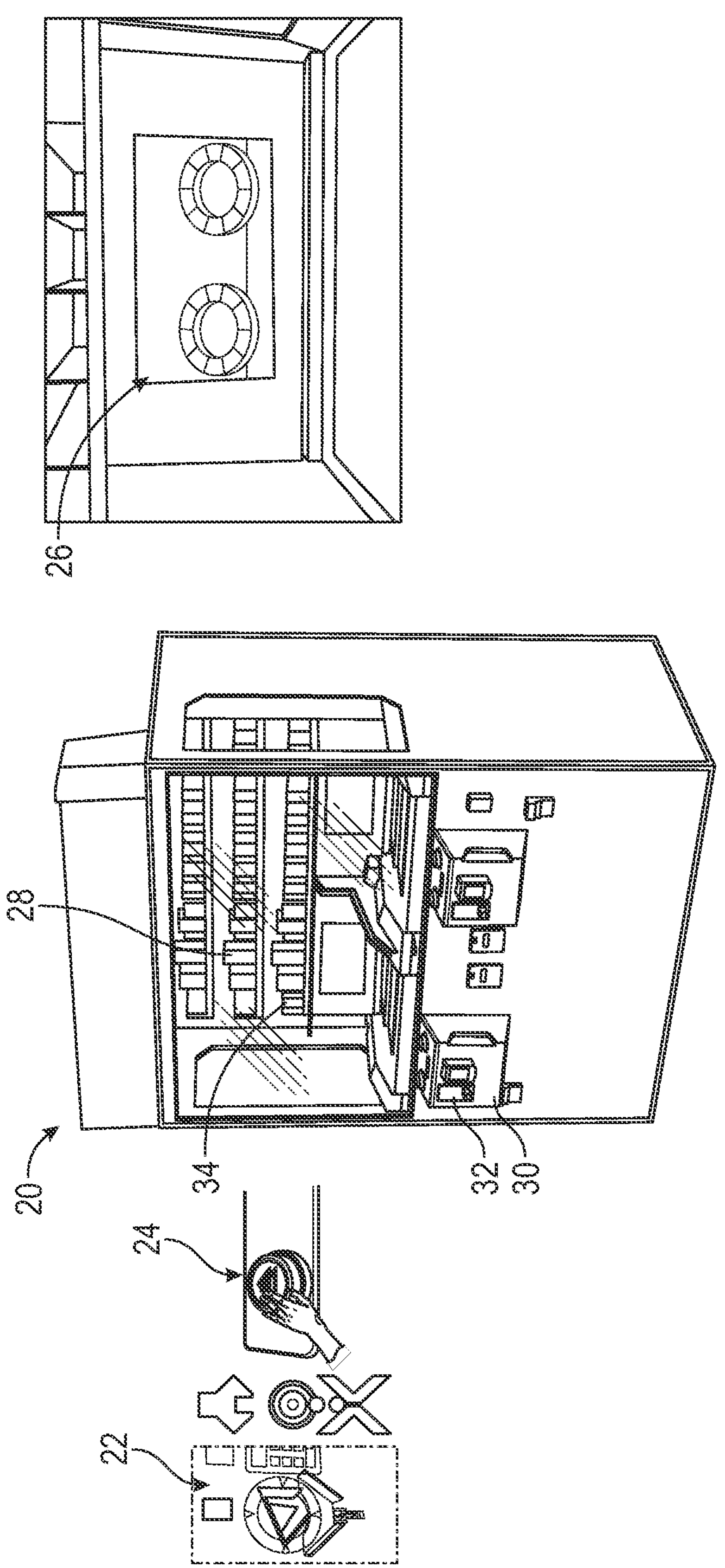
FIG. 1 depicts an embodiment of the current invention's arcade game machine, and exploded views of the ball hopper, ball release control button, and color display of this embodiment.

FIG. 1 discloses an embodiment 20 of the current invention's arcade game machine, and the exploded views of its ball hopper 22, its ball release control button 24, and its gameplay graphical interface 26, where this embodiment 20 further comprises a see-through arcade game box 28 and an external game control panel 30. The ball release control button 24 is disposed on the game control panel 30. This game control panel further comprises a coin deposit slot 32, where, to start a game, a player has to deposit a coin. The coin buys a predefined number of balls for the player, and the balls are stored in a ball storage internally above the ball hopper 22. As the player presses the control button 24, a ball is released down the hopper 22 and passes the X mark sensor by the lowest end of the hopper. As soon as the player deposits a coin, the gameplay graphical interface 26 is activated to display the gameplay. This embodiment further comprises the prize package dispenser and its racks 34, where prize packages are stored and dropped to a pickup bin as game rewards. It is contemplated that in one embodiment one ball release control button is set up and associated with both virtual wheels displayed on the graphical interface 26. In another embodiment, two ball release control buttons, left and right, are set up and associated with the left and right virtual wheels, respectively. That is, when the left button is pressed, the left wheel and its prizes are in play. Similarly, when the right button is pressed, the right wheel and its prizes are.

Figure 2:
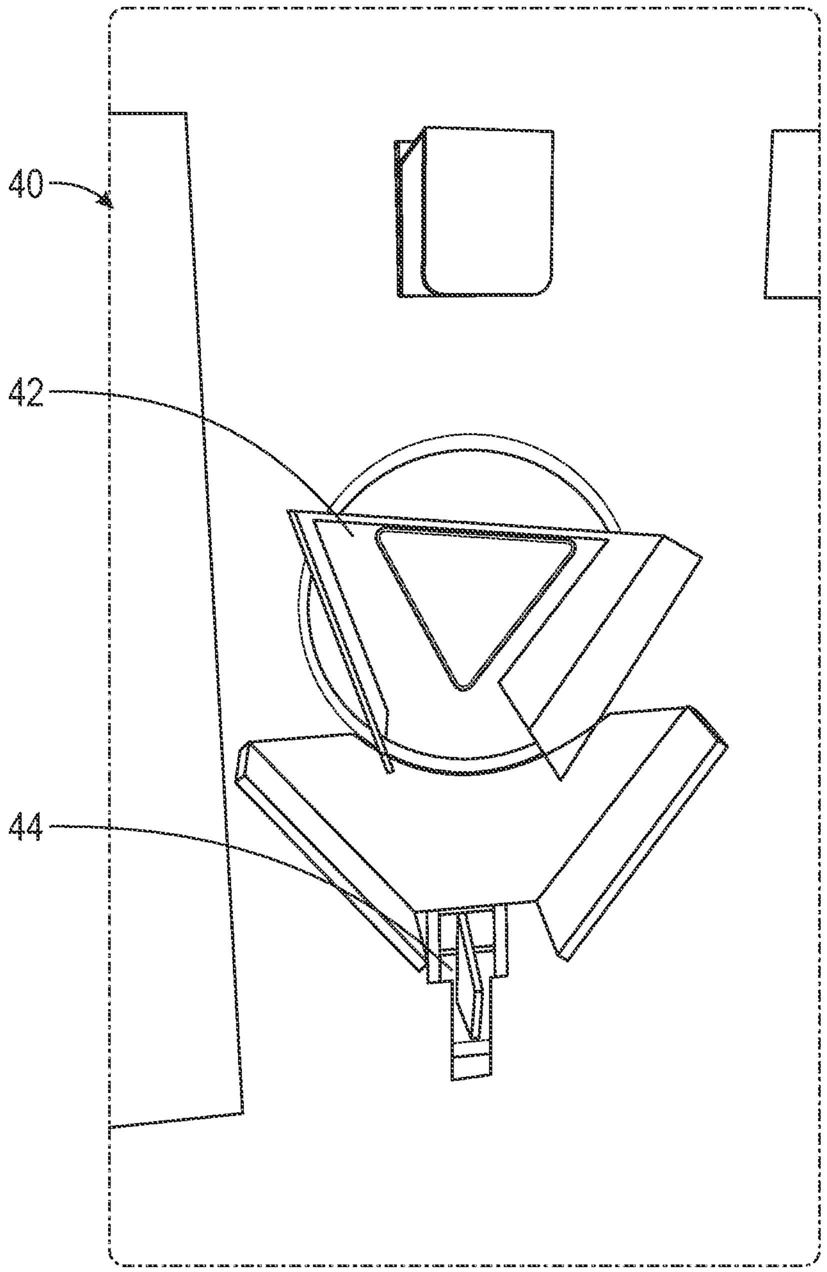
FIG. 2 depicts an embodiment of the current invention's ball release hopper.

FIG. 2 discloses an embodiment 40 of the current invention's ball hopper that is disposed vertically, partially see-through and comprises a ball passage and a sensor near the exit end of the hopper. The ball hopper 40 has a partially see-through midsection 42, where on the external wall is marked with an arrow head. When a player presses the ball release control button, disclosed in FIG. 1 and its detailed description, a ball is dropped and passes through this midsection. The player could see the ball through the see-through wall. After passing the see-through midsection, the ball passes the sensor 44 before exiting the hopper. By the sensor 44, the external wall of the hopper is marked with an X sign that is lit by lights. When a ball is detected by the sensor 44, the X sign's lights are lit up to alert the player of the event.

Figure 3:
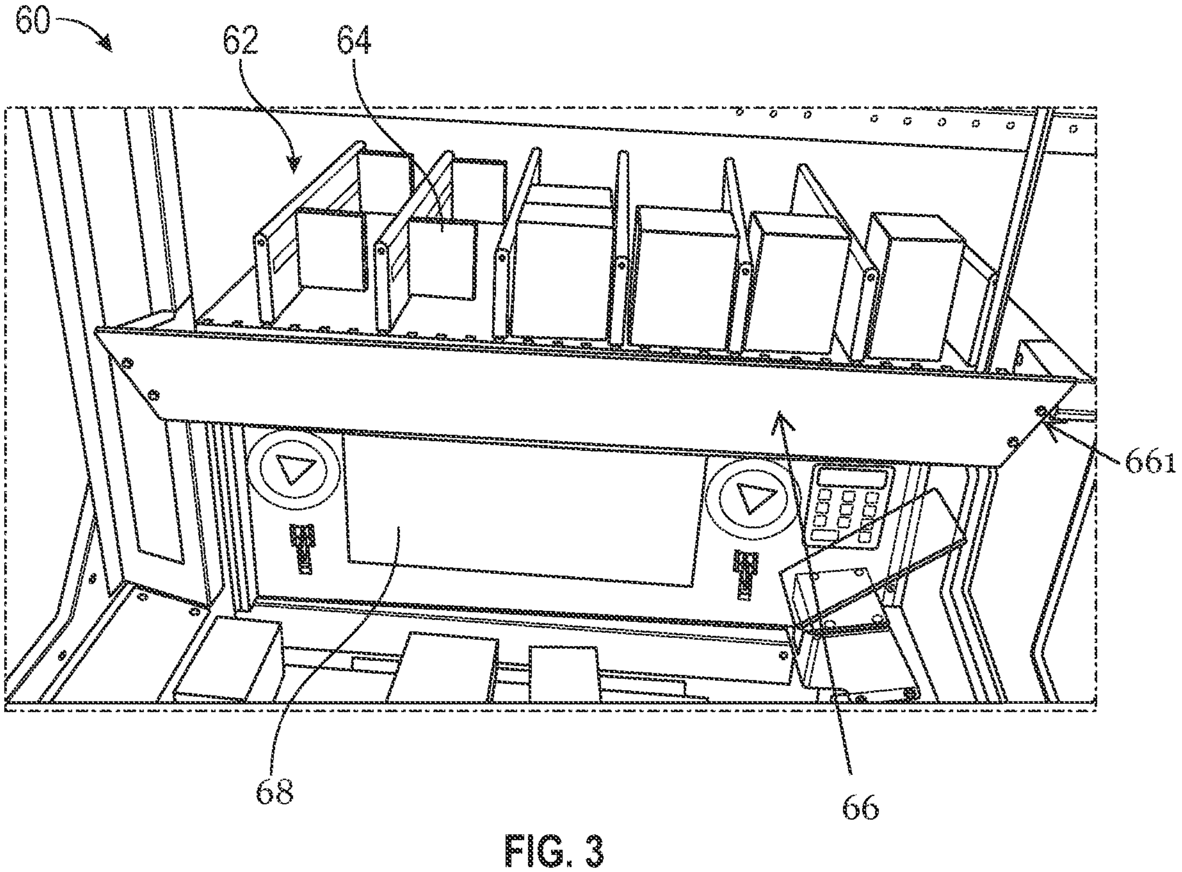
FIG. 3 depicts an embodiment of the current invention's several important elements, such as the prize package dispenser and its racks, the prize package guide, and the color display.

FIG. 3 discloses an embodiment 60 of the current invention's arcade game machine, which comprises a see-through front, a prize package dispenser 62 and its racks 64, a prize package guide 66, and a gameplay graphical interface 68. The color graphical interface 68 displays the gameplay's virtual components, and the player's game progress with counters of balls, prize tickets, deposited coins, and game status. The dispenser 62 stores the available prize packages in rows of racks 64. As the player wins a prize package the game controller causes one of the racks 64 to push the prize package toward the see-through front and the edge of the dispenser 62 until the package is off the edge thereof. As the prize package drops, it comes into contact with the prize package guide 66, which is made of hard plastic to soften the drop of the package without damaging it and guide the package toward the back of the flat tray away from the package pickup bin. The package's drop to the tray is softened such that it does not cause the balls on the tray to bounce off the tray into the prize pickup bin. The package's drop is calibrated in two ways. The plastic guide can be made of plastic with different hardness to soften the package's drop. The plastic guide is attached to two swingable arms 661 at an angle. The depth of the guide, the angle of its disposition, how much its swing yield, and its hardness can be calibrated to soften the package's drop.

Figure 4A:
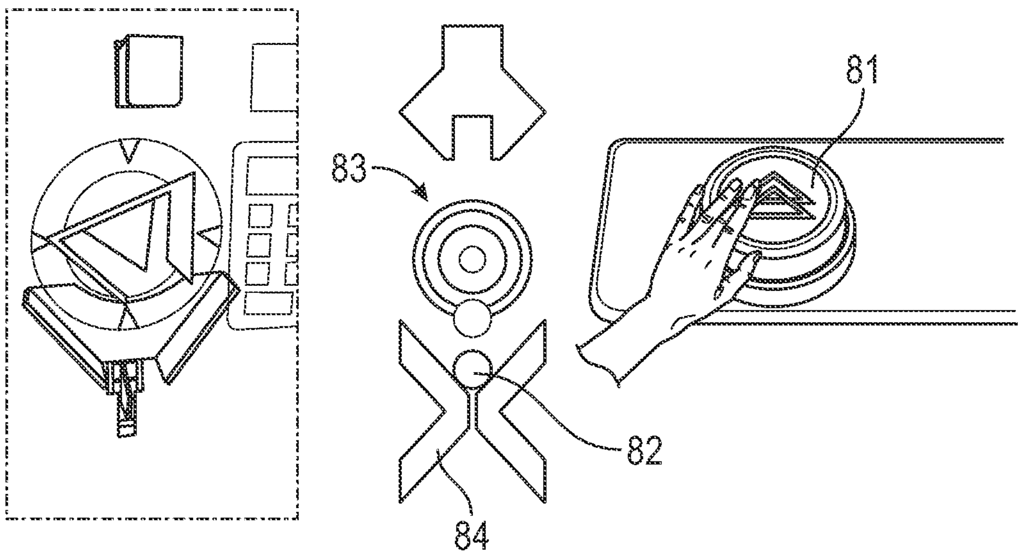
FIG. 4 depicts an embodiment of the current invention's gameplay, that occurs after a player presses the ball release control button.
Figure 4B:
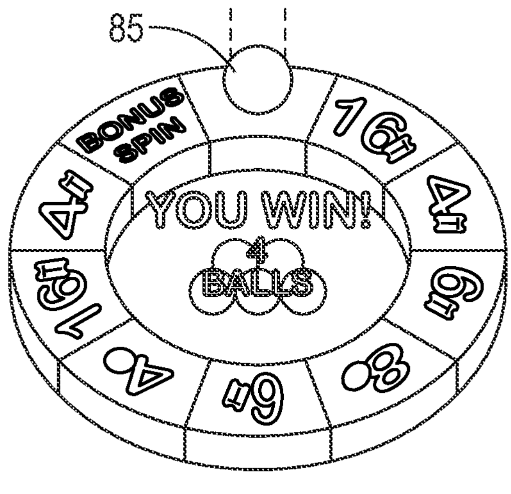

FIGS. 4A and 4B further illustrate when a player presses the ball release control button 81, a ball 82 is dropped down the hopper 83 and its sensor 84, presented by the neon light X sign. When the ball 84 passes through the sensor 84 and is detected, the X sign lights are lit up and a virtual ball 85 is appeared on the gameplay graphical interface dropping down the display screen.

Figure 5:
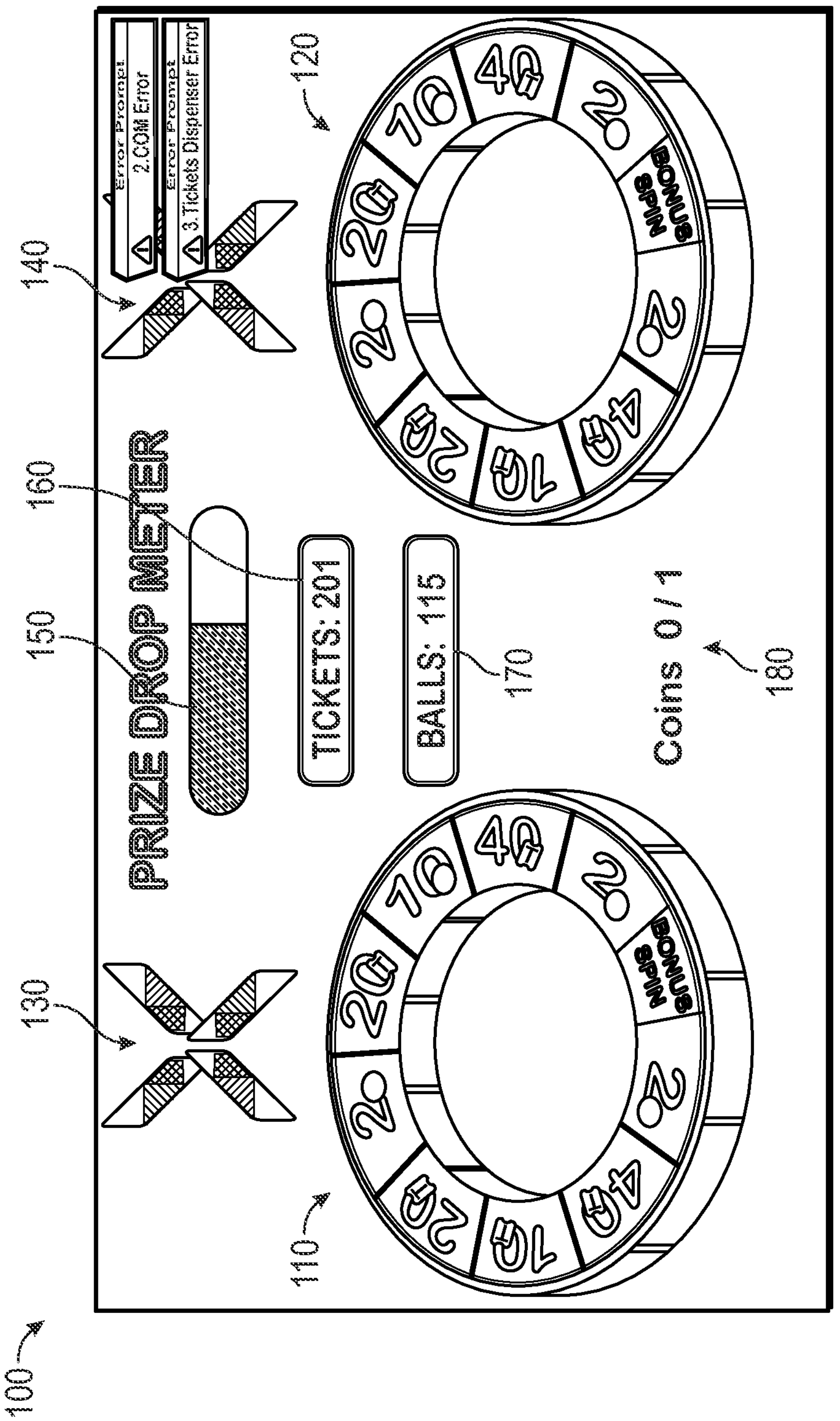
FIG. 5 depicts an embodiment of the current invention's main gameplay graphical interface, that a player will watch for the duration of his gameplay.

FIG. 5 discloses an embodiment 100 of the current invention's main graphical interface and gameplay, where this embodiment 100 comprises a left virtual wheel 110 and a right virtual wheel 120, a left virtual X sign 130 and a right virtual X sign 140, a prize drop meter, or progress bar, 150. This embodiment also keeps counts of the number of prize tickets the player has earned with the ticket counter 160, and the number of balls the player has gotten with the ball counter 170. This embodiment also tracks the total deposited coins and unspent coins with the coin counter 180. This main graphical interface is presented to the player during most of the duration of the gameplay. It is contemplated that this embodiment 100 is disposed inside a see-through arcade game machine that has a coin deposit slot device, a ball release control button disposed on a game control panel disposed on the exterior of the arcade machine. As the player deposits some coins to begin the gameplay, he is provided with a preconfigured number of balls. The left and right virtual wheels 120 and 130 also begin spinning, and keep spinning unless the player's gameplay causes other preconfigured events of the game to occur, such as bonus spins or prize drops. The player plays the game by pressing the ball release control button on the external control panel, and causes a ball to drop down a hopper to a bin below. As the ball crosses a sensor on the way down through the hopper, the virtual X signs 130 and 140 will be lit up, and if, at that moment, a marked sector of the wheels 110 and 120 lined up with the X signs' blink, the player wins the prize displayed on the wheels in that sector. The prize could be a prize package, a certain number of prize tickets, or a certain number of balls. The wheels 110 and 120 further comprises one sector for a special bonus spin. If the player wins this special bonus spin, he will be presented with an additional graphical interface that is disclosed in FIG. 6. Furthermore, every time the player gets the perfect timing of hitting the control button to drop a ball, the ball passing the sensor at the moment a sector of the wheel 110 or 120 aligns with the virtual X sign 130's or 140's blink, respectively, the prize drop progress bar increases by a preconfigured percent, eg., 10%, 15%, etc. When this progress bar reaches 100%, a prize package is dropped on a tray below, and the Prize Drop progress bar is reset to 0%. To increase the difficulty, and thus the challenging, of the game, the prize packages do not immediately drop into the pickup bin for the player. The player has to achieve the second stage of the game to cause the prize packages to drop from the tray to the pickup bin. This second stage is depicted and described below.

Figure 6:
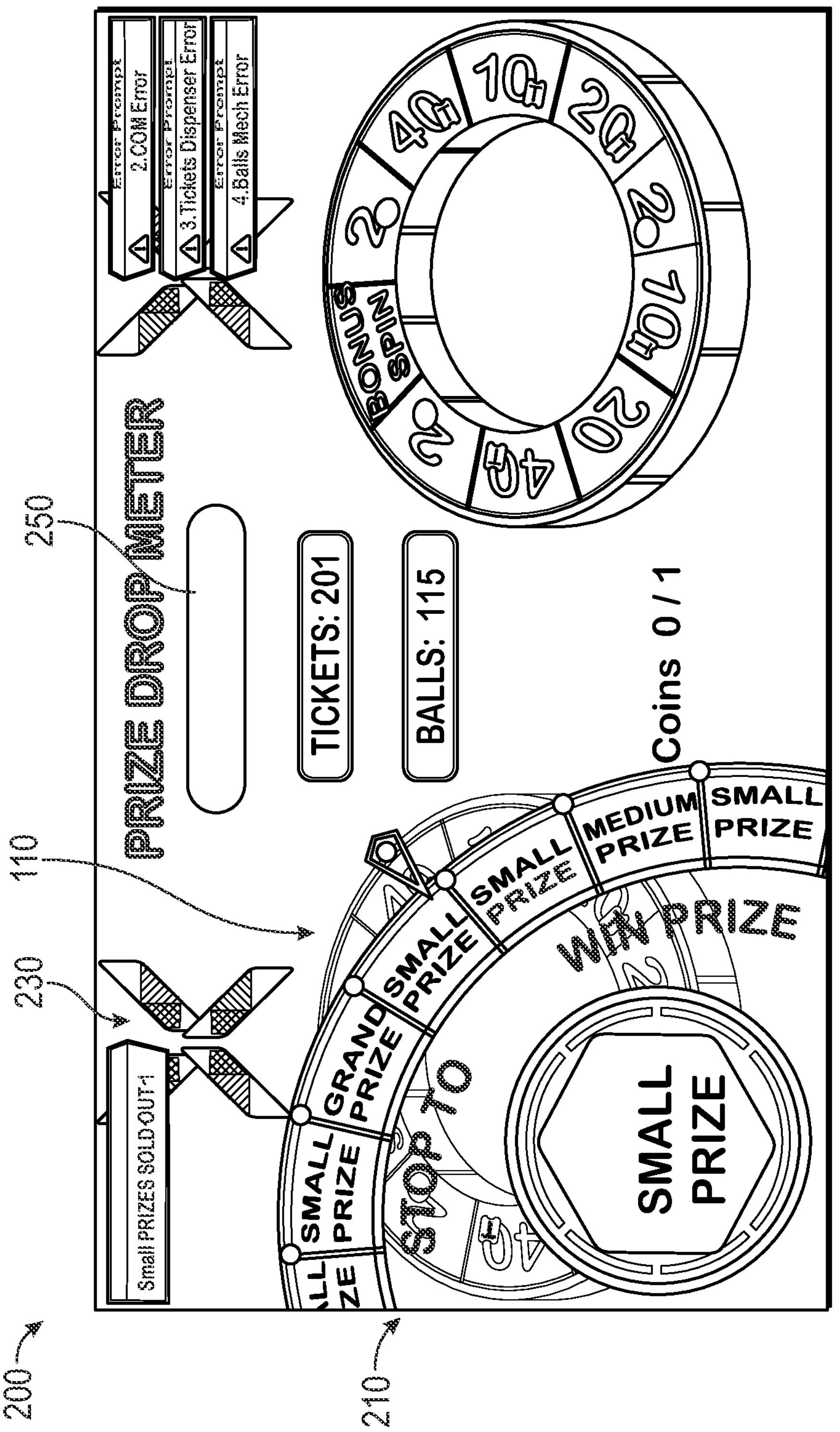
FIG. 6 depicts another embodiment of the current invention's gameplay graphical interface, when a player wins a bonus spin and a bonus spin wheel is shown.

FIG. 6 discloses an embodiment 200 of a current invention's graphical interface and gameplay, that is presented when the player wins the special bonus spin prize disclosed in FIG. 5. In this graphical interface a larger wheel 210 is presented superimposing the left virtual wheel 110 disclosed in FIG. 5. The wheel 210 presents three bonus prize types, grand, medium, and small. In this part of gameplay, the aligning of a prize sector on the wheel 210 and the X sign 230 is by chance without the player's participation. This bonus prize, whichever size it is, is guaranteed because all sectors of the bonus spin wheel have a prize in it. Thus, after this bonus spin the prize drop progress bar 250 is reset to 0%.

Figure 7:
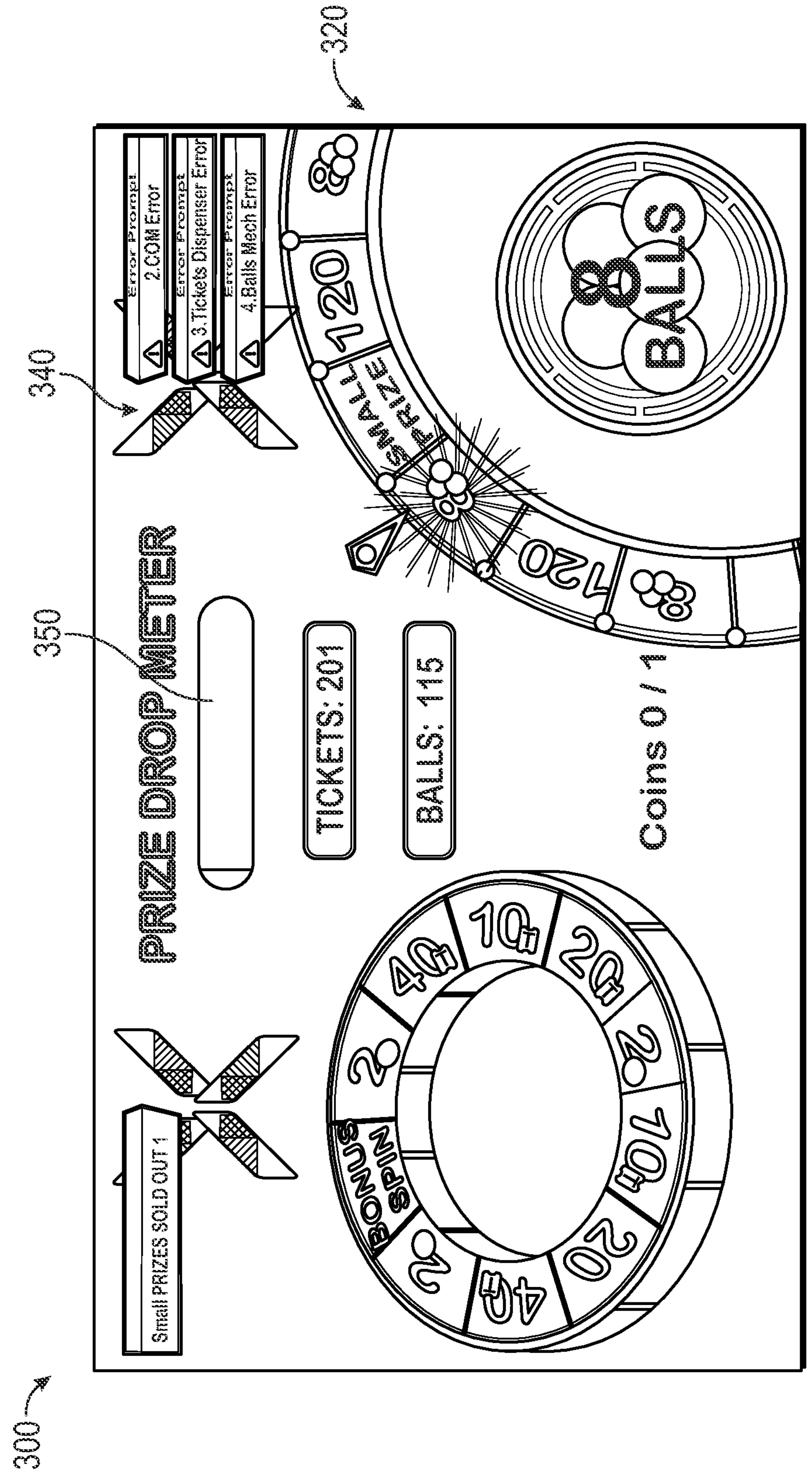
FIG. 7 depicts another embodiment of the current invention's gameplay graphical interface, when a player wins a bonus spin and a bonus spin wheel is shown.

FIG. 7 discloses another embodiment 300 of a current invention's graphical interface and gameplay, where the player wins a special bonus spin of the virtual wheel 120 disclosed in FIG. 5 on the right side of the graphical interface. In this graphical interface 300, a larger wheel 320 is presented superimposing the right virtual wheel 120. The larger wheel 320 presents different preconfigured bonus prizes, such as a number of balls, a number of prize tickets, or a prize package. In this part of gameplay, the aligning of a prize sector on the wheel 320 and the X sign 340 is by chance without the player's participation. This bonus prize, whichever it is, is guaranteed because all sectors of the bonus spin wheel have a prize in it. However, unlike the left bonus spin wheel disclosed in FIG. 6, this bonus spin only resets the prize drop progress bar 350 when the player wins a prize package.

Figure 8:
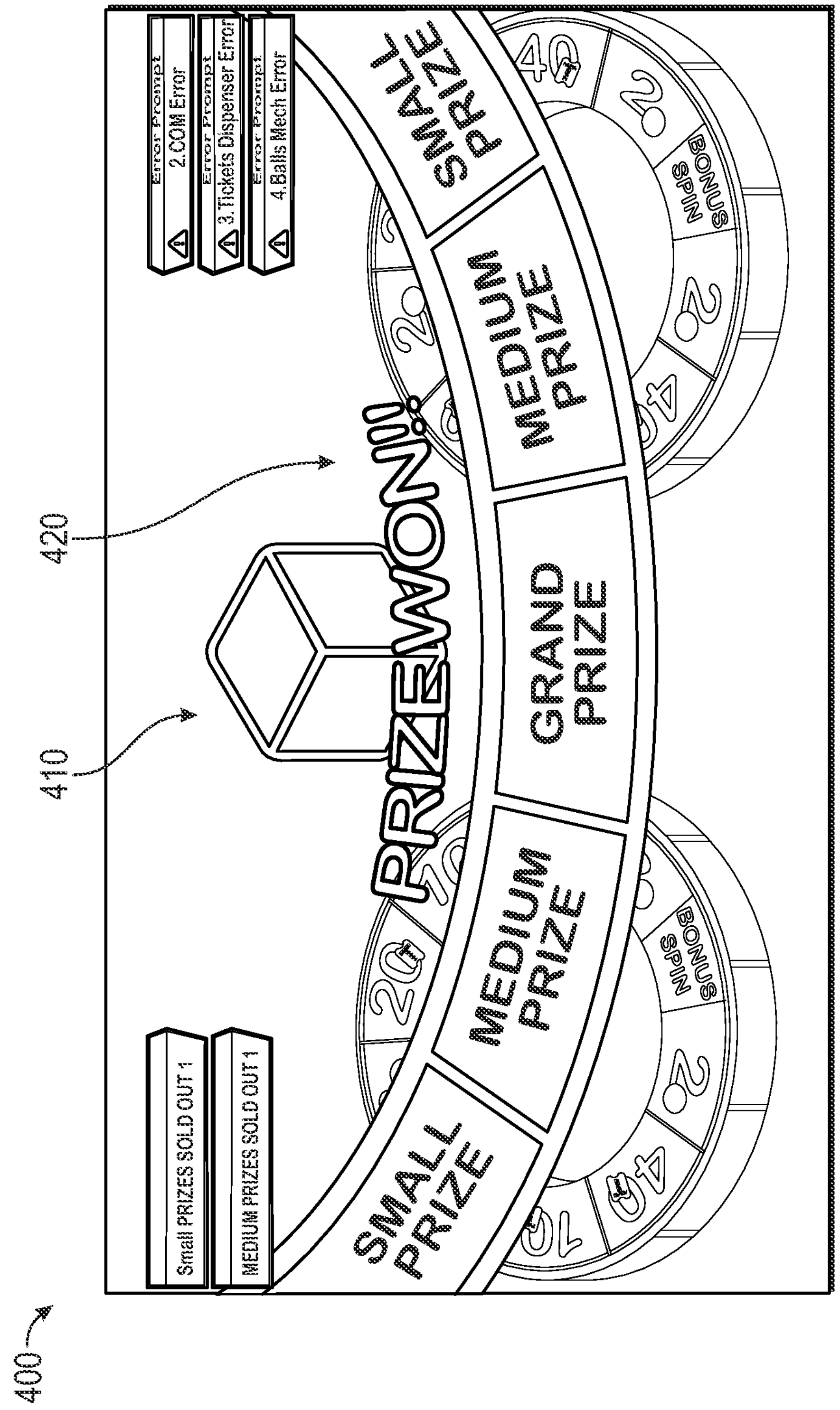
FIG. 8 depicts yet another embodiment of the current invention's gameplay graphical interface, where a prize is won.

FIG. 8 discloses another embodiment 400 of a current invention's graphical interface and gameplay, where a prize package is won. As a prize package is pushed toward the front of the dispenser's rack and toward the player, this graphical interface 400 is presented to the player with, perhaps, prize package icon 410, and/or a flashing text "Prize Won!" 420, and/or a winning tune. As disclosed earlier, when a prize drop event occurs, the prize drop progress bar is reset to 0%.

Figure 9:
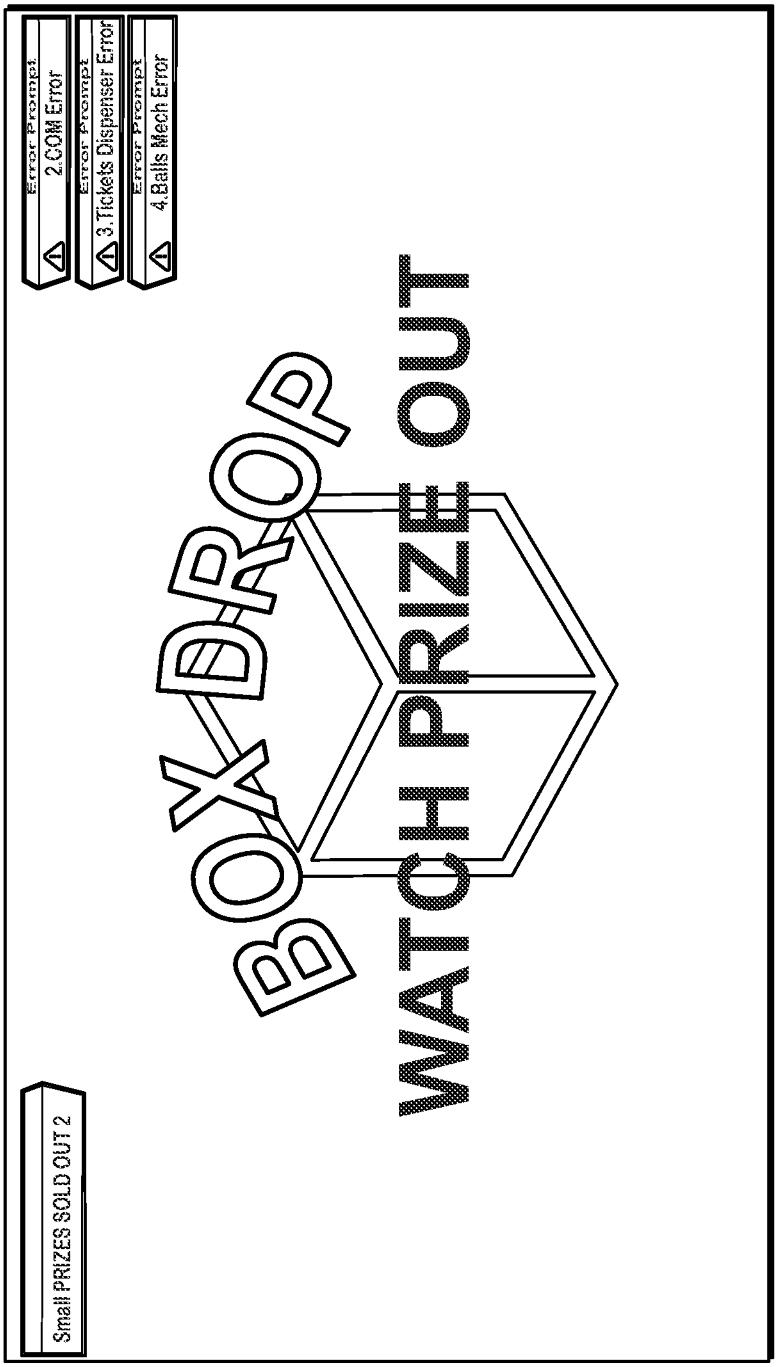
FIG. 9 depicts an embodiment of the current invention's gameplay graphical interface, that shows an alert message of a prize package drop event during a gameplay.

FIG. 9 discloses another embodiment 500 of a current invention's graphical interface and gameplay, where a prize package is actually dropped in the pickup bin. As a prize package is dropped to the pickup bin below a flashing alert will be displayed on the interface to alert the player of the prize.

Figure 10:
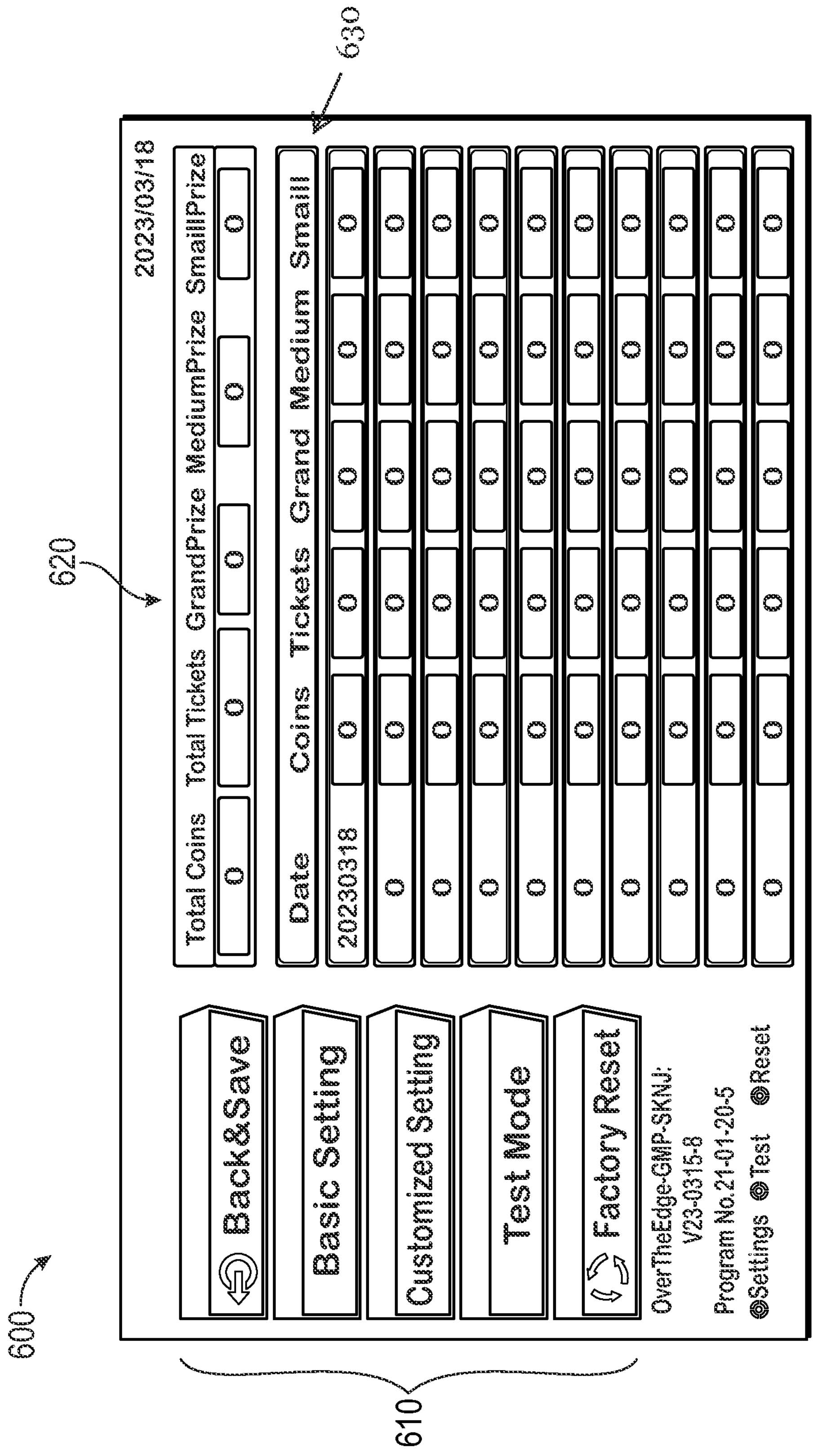
FIG. 10 depicts another embodiment of the current invention's system management and configuration interface, where a personnel of a game establishment sees and obtains the accounting of a game machine since the last reset.

FIG. 10 discloses an embodiment 600 of a current invention's graphical interface, and game machine management and configuration function, where the configuration main menu is presented to the game establishment personnel. It is contemplated that game players have no access to this part of the invention's graphical interface. That is a personnel has to pass through security checks, such as login password and/or other methods of authentication to access this part of the invention's graphical interface. It is also understood that this embodiment 600 is an exemplary configuration menu. It is contemplated that there are many versions, or variations, of the configuration, which is modified by the manufacturer on its own or per the game establishments' orders. This embodiment 600 comprises a left menu panel 610 that in turn comprises several options to configure different aspects of the game. When a user select a menu option on the left menu panel, a sub-menu associated with the selected option is presented on the right. This sub-menu can be another list of options, or, if there is only one option, then the user is presented with a confirm command option to confirm the choice and set off the action, or a go-back command option to cancel the choice and return the previous menu screen. In this exemplary embodiment, after a personnel gains entry to this part of the graphical interface, the personnel is presented with a set of two tabular up-to-date accounting reports, the grand total numbers table 620 and the total numbers per date table 630. Table 620 shows total coins deposited, total tickets rewarded, total Grand, Medium, and Small prizes rewarded. Table 630 breaks down the sums shown in table 620 to per date sums.

Figure 11:
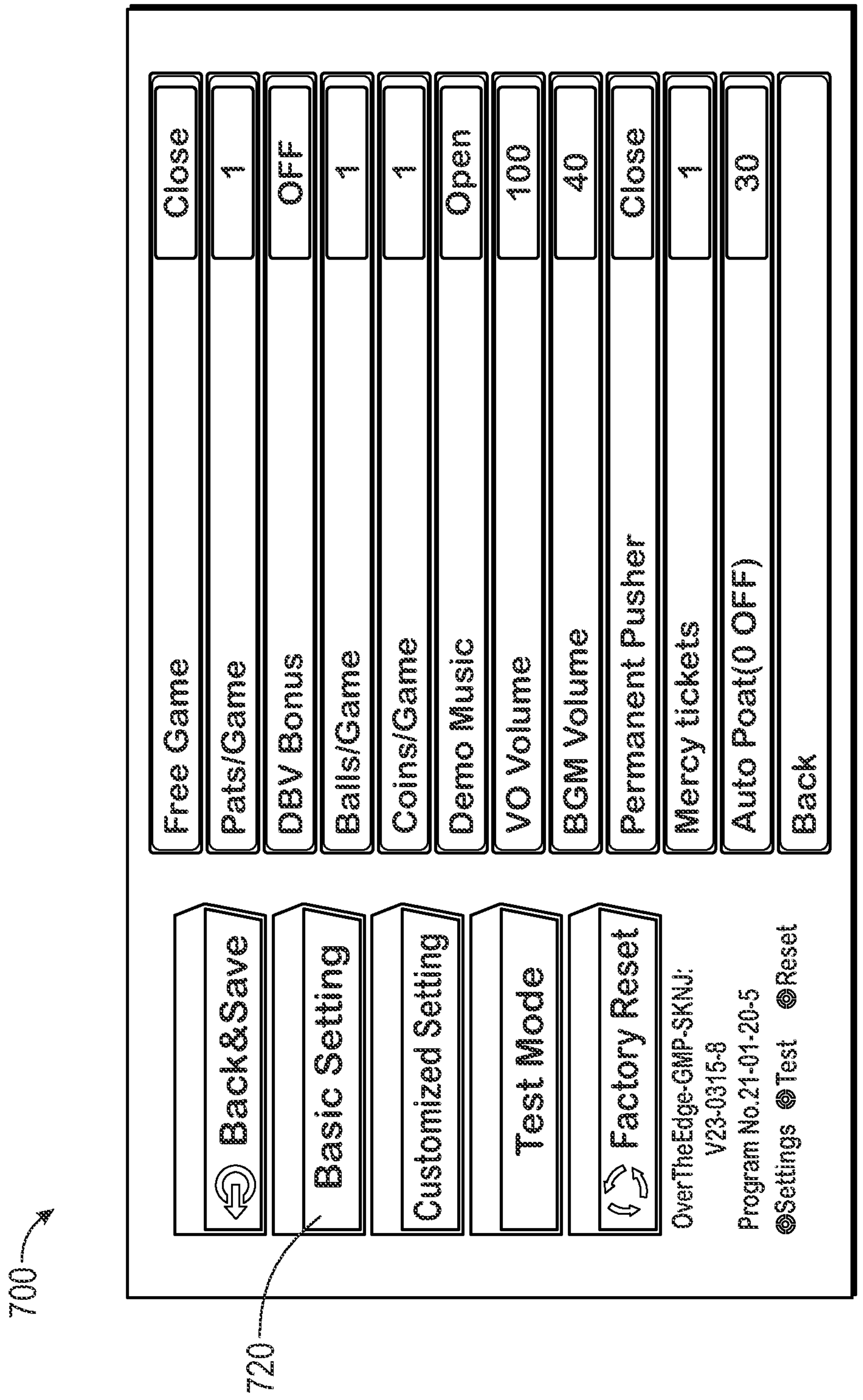
FIG. 11 depicts another embodiment of the current invention's system management and configuration interface, where a personnel of a game establishment set up basic settings of a game machine.

FIG. 11 discloses another embodiment 700 of a current invention's graphical interface, and machine management and configuration function, where the user has selected the Basic Setting option 720 on the left menu panel 610 disclosed in FIG. 10, and the Basic Setting sub-menu is shown to the right of the menu panel. The Basic Setting sub-menu comprises many configuration options, such as Free Game, Pats/Game, bonus, music, volume, among others. Each option in the sub-menu is a single action command that changes one characteristic of the gameplay and/or rewards. The last option in the sub-menu is the Back option which will cancel the changes, if any, to the basic settings, and return the interface to the previous menu screen.

Figure 12:
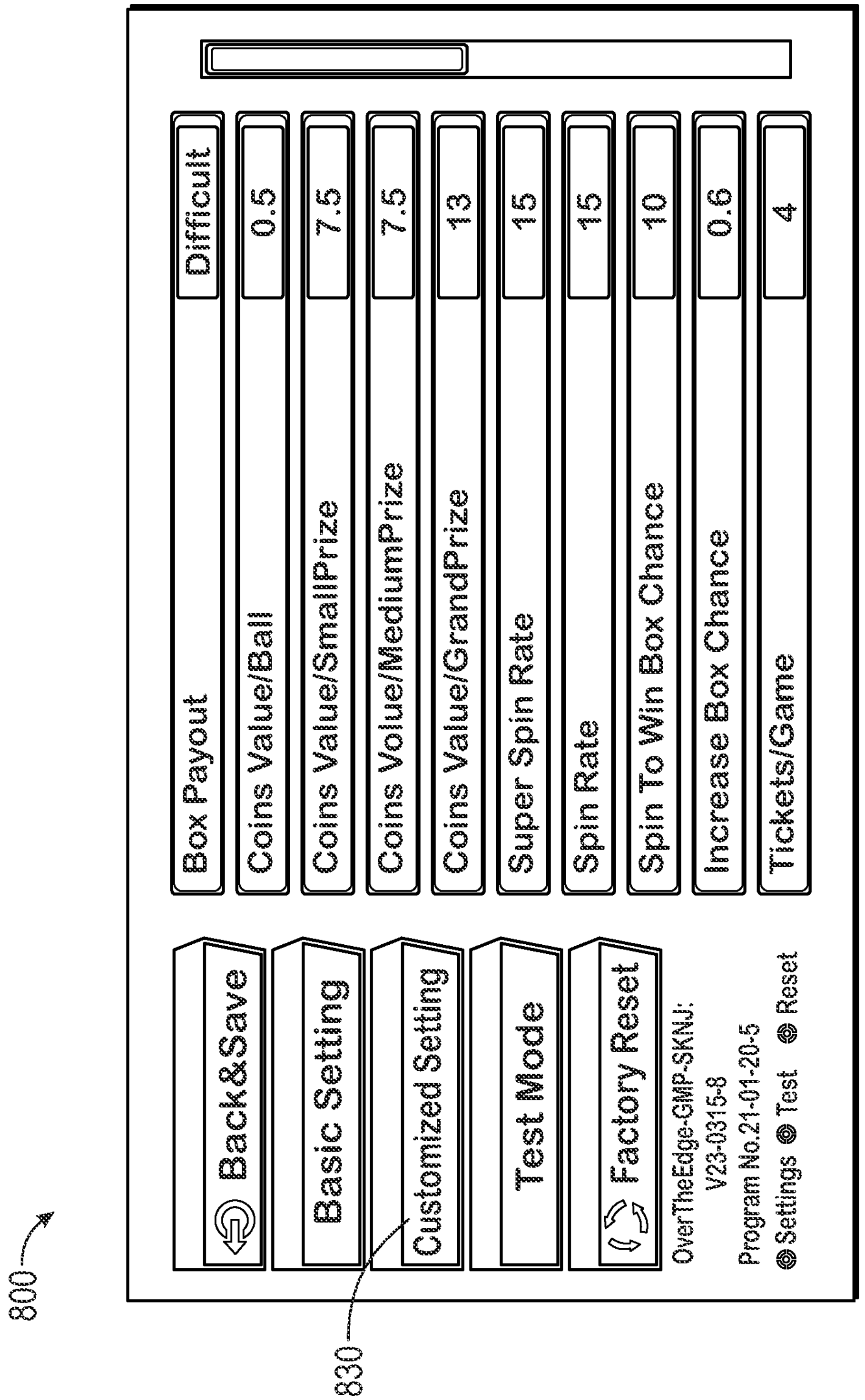
FIG. 12 depicts another embodiment of the current invention's system management and configuration interface, where a personnel of a game establishment set up the customized settings of a game machine.

FIG. 12 discloses another embodiment 800 of a current invention's graphical interface, and machine management and configuration function, where the user has selected the Customized Setting option 830 on the left menu panel 610 disclosed in FIG. 10, and the Customized Setting sub-menu is shown to the right of the menu panel. The Customized Setting sub-menu comprises many gameplay customization options, such as Box Payout for how difficult for a player to win a prize package, the relative values of a ball, a prize to a coin, the regular and bonus spin rate, the chance to win a prize package of each package type, etc. This embodiment 800 further comprises a scroll bar to the right of the sub-menu, indicating the sub-menu has more options than those that fit into the screen.

Figure 13:
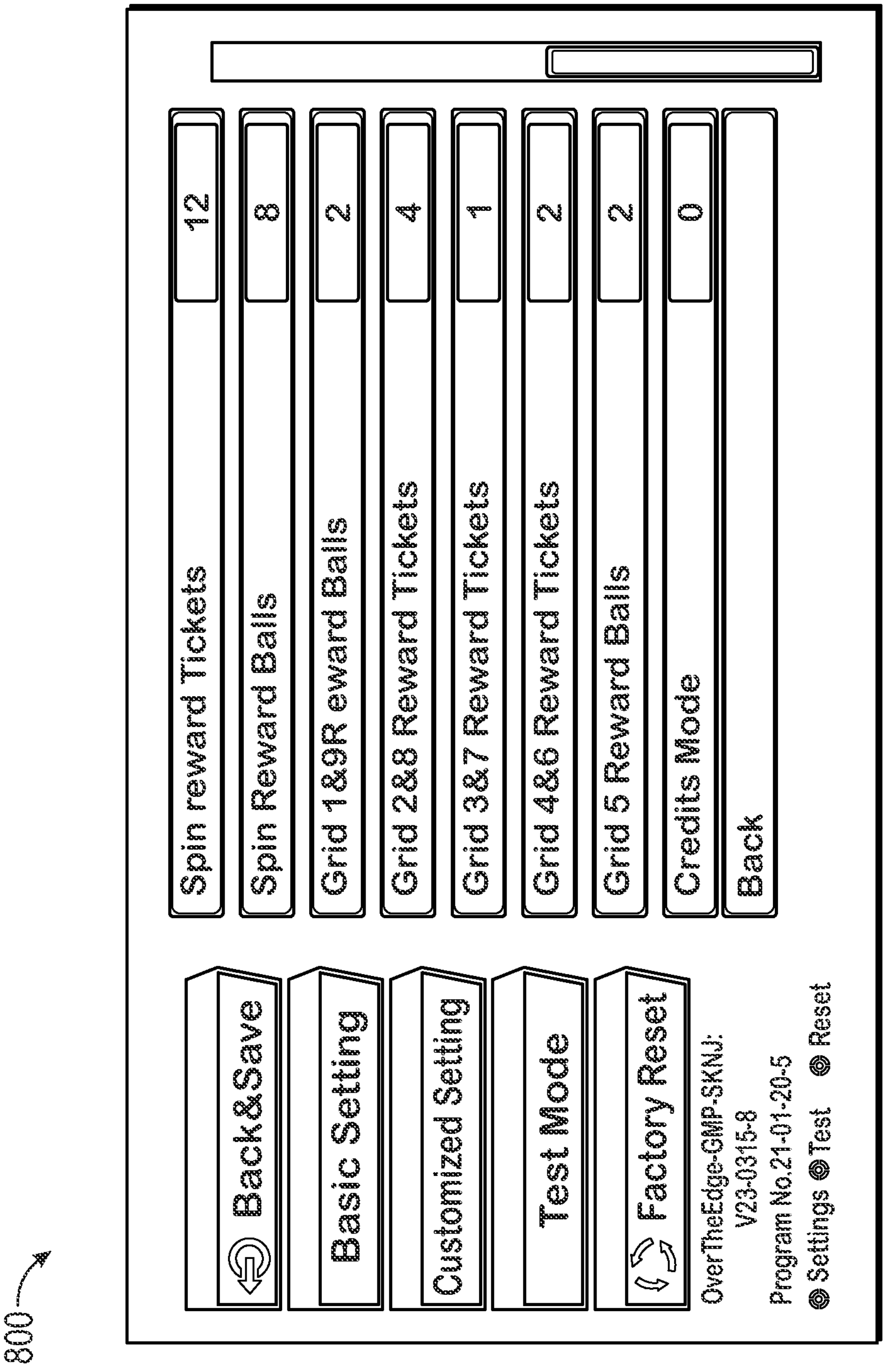
FIG. 13 continues to depict the next portion of the customized settings of a game machine.

FIG. 13 discloses a bottom half of the graphical interface 800 disclosed in FIG. 12. In this bottom half, the Customized Setting sub-menu further comprises more gameplay customization settings. This invention allows a personnel to configure the prize for each sector of the virtual wheels disclosed in FIGS. 5-7. As a standard, the last option in the sub-menu is the Back option which will cancel the changes, if any, to the customized settings, and return the interface to the previous menu screen.

Figure 14:
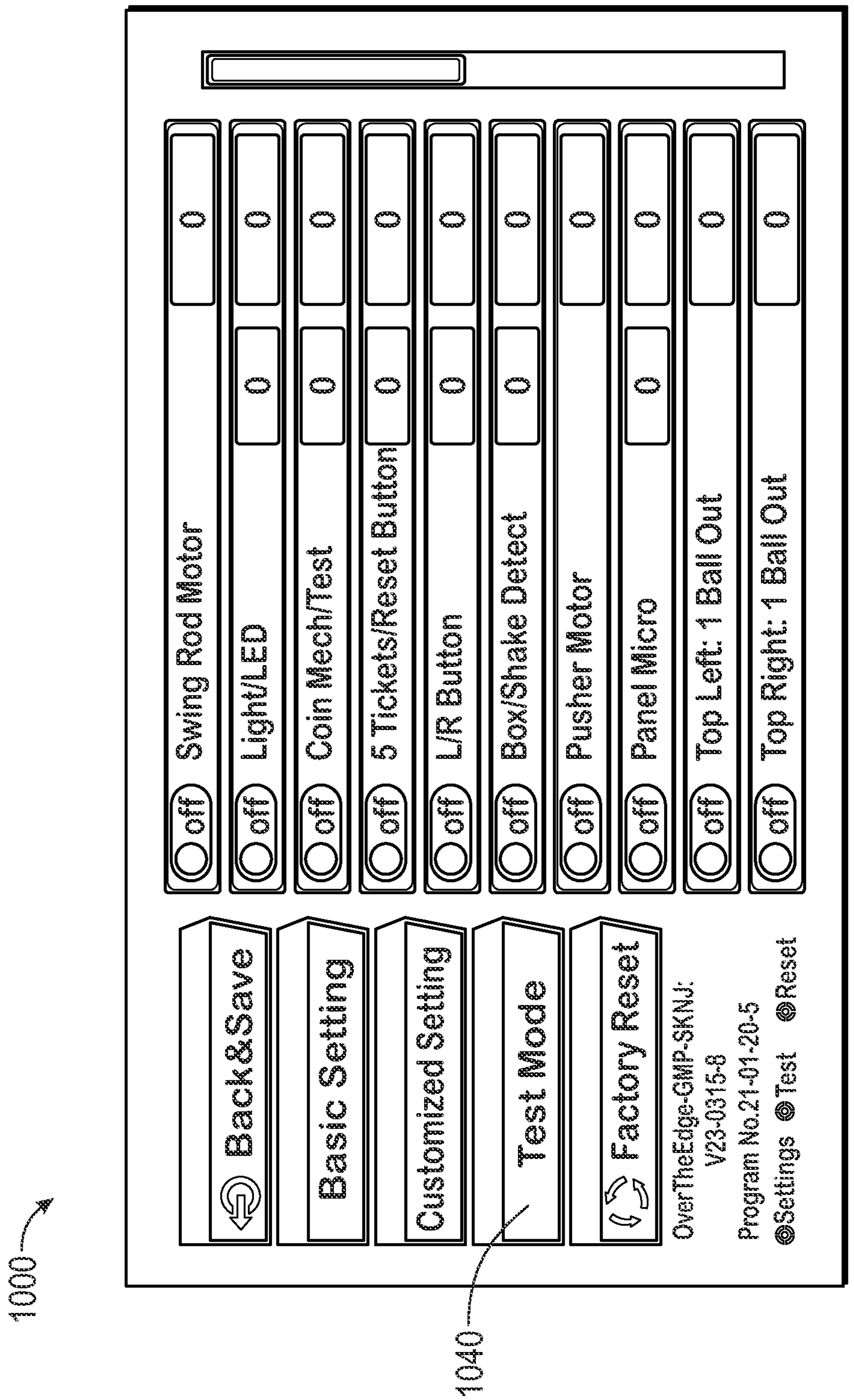
FIG. 14 depicts another embodiment of the current invention's system management and configuration interface, where a personnel can configure different system and feature tests of a game machine.
Figure 15:
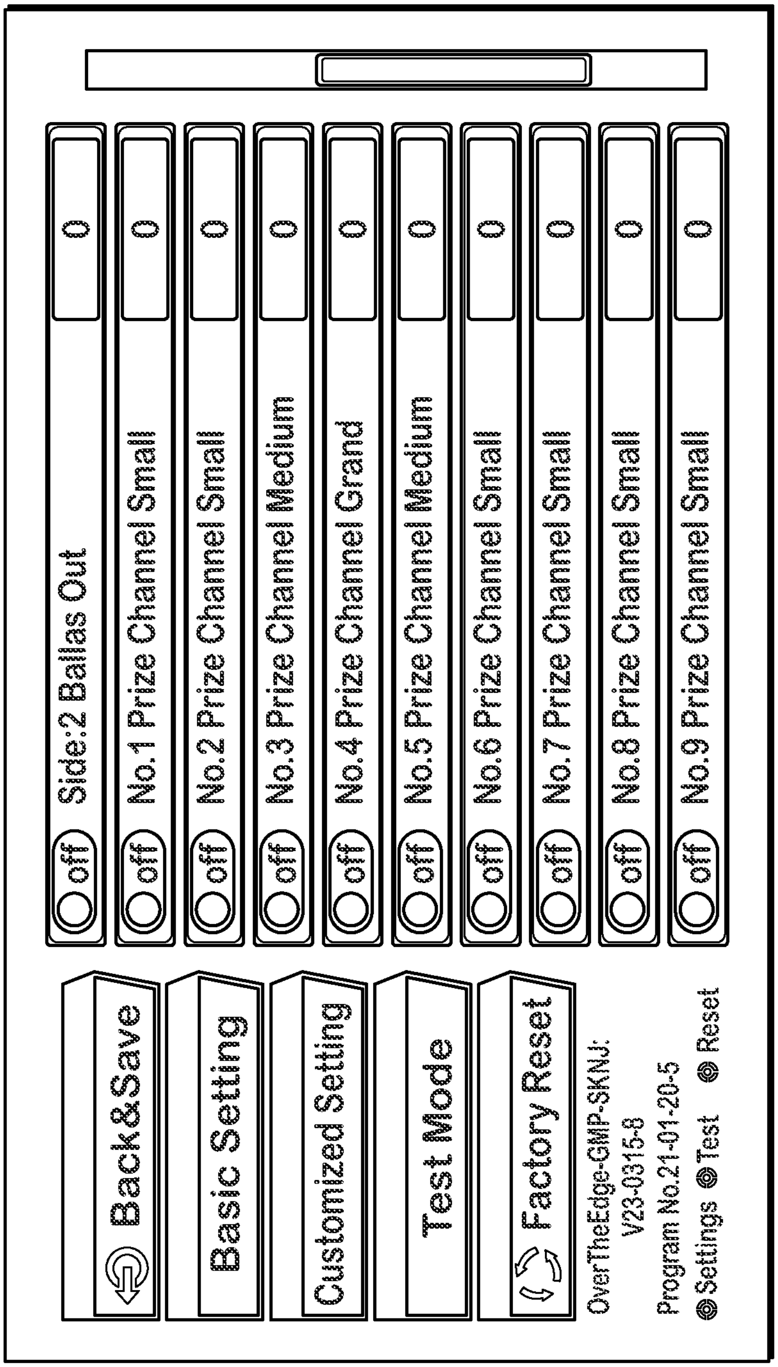
FIG. 15 continues to depict the different system and feature tests of a game machine.
Figure 16:
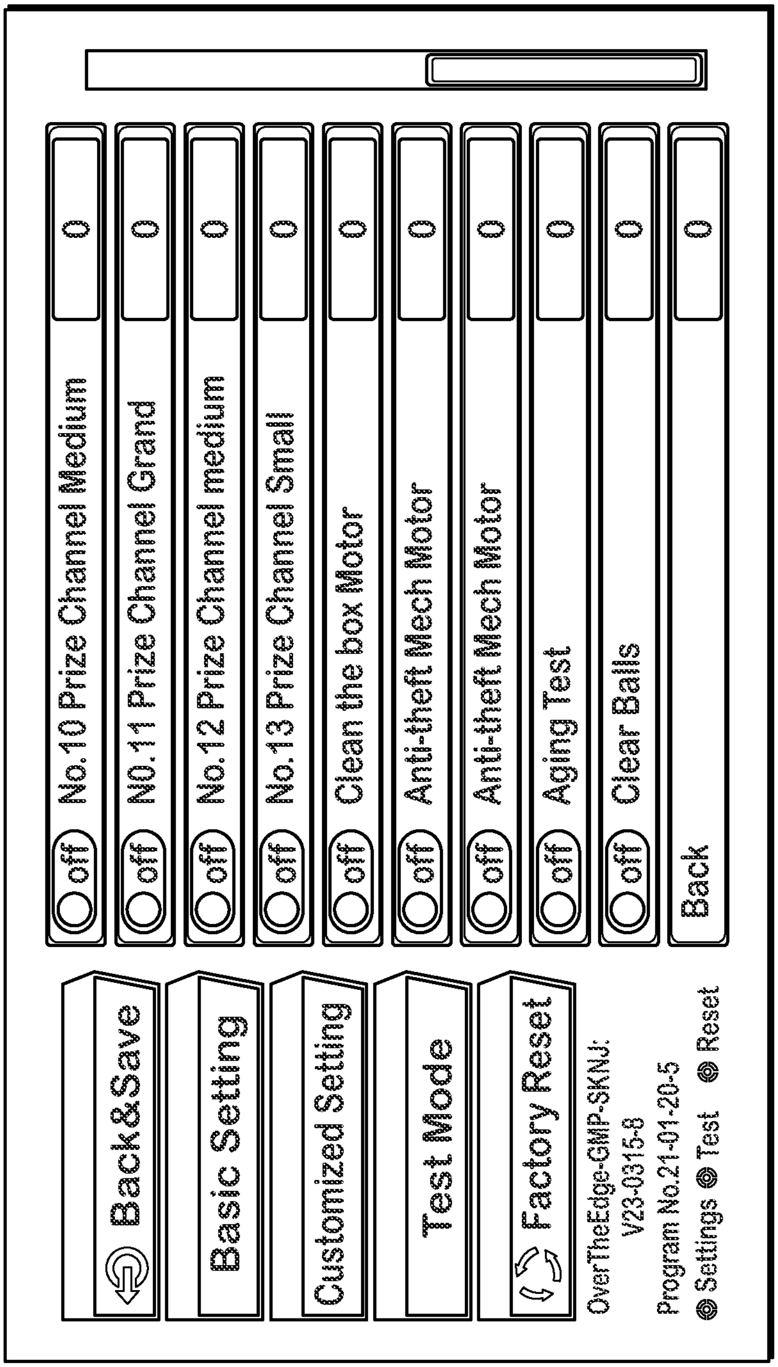
FIG. 16 continues to depict the different system and feature tests of a game machine.

FIGS. 14-16 disclose another embodiment 1000 of a current invention's graphical interface, and machine management and configuration function, where the user has selected the Test Mode option 1040 on the left menu panel 610 disclosed in FIG. 10, and the Test Mode sub-menu is shown to the right of the menu panel. The Test Mode sub-menu comprises many testing options for the personnel. Because of the many options, the sub-menu options runs on three screens.

Figure 17:
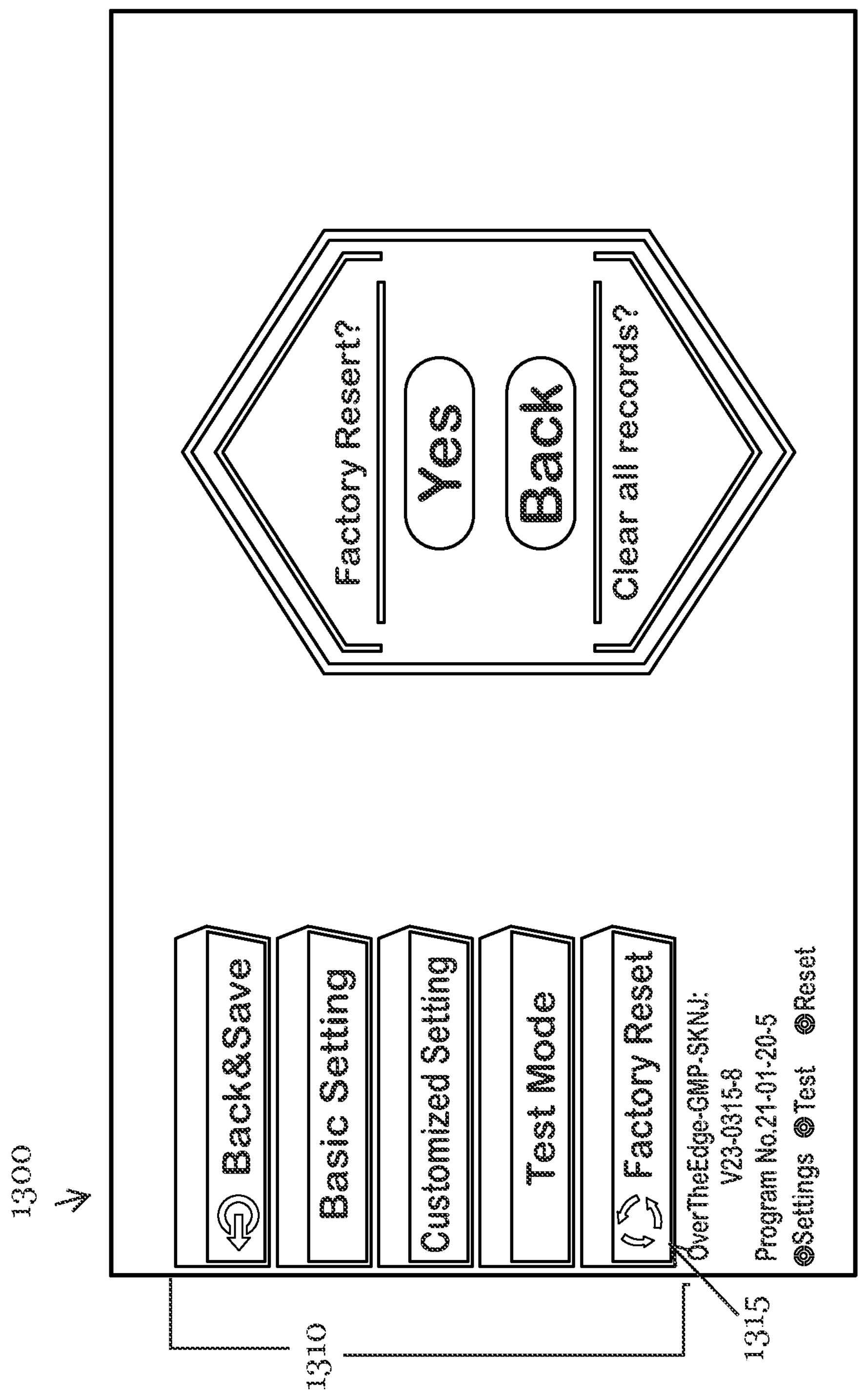
FIG. 17 depicts an embodiment of the current invention's gameplay graphical interface, where a personnel can reset a game machine to its manufacturer's settings, and clear all the accounting to that time.

FIG. 17 discloses an exemplary embodiment 1300 of a current invention's graphical interface, and game machine management and configuration function, where a personnel selects Factory Reset option 1315 on the left menu panel 1310, which brings up the factory reset sub-menu on the right, which is a single action sub-menu. The Factory Reset sub-menu presents only Yes or Back option to the personnel. The Yes option will reset all the configuration in the machine to the manufacturer's settings. The Back option will cancel the Factory Reset action and return the interface to the previous menu screen.

Figure 18A:
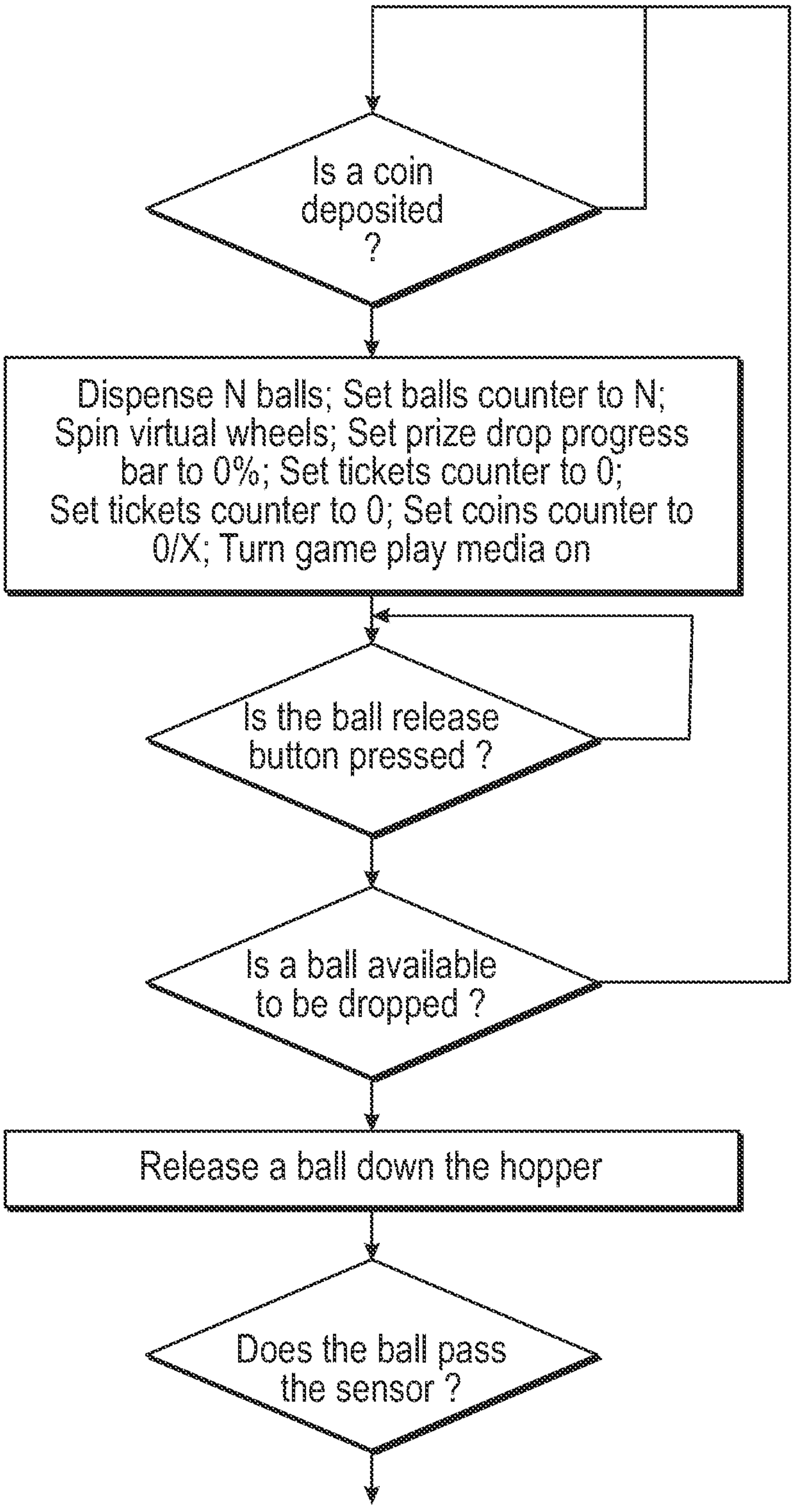
FIG. 18A depicts the current invention's gameplay.
Figure 18B:
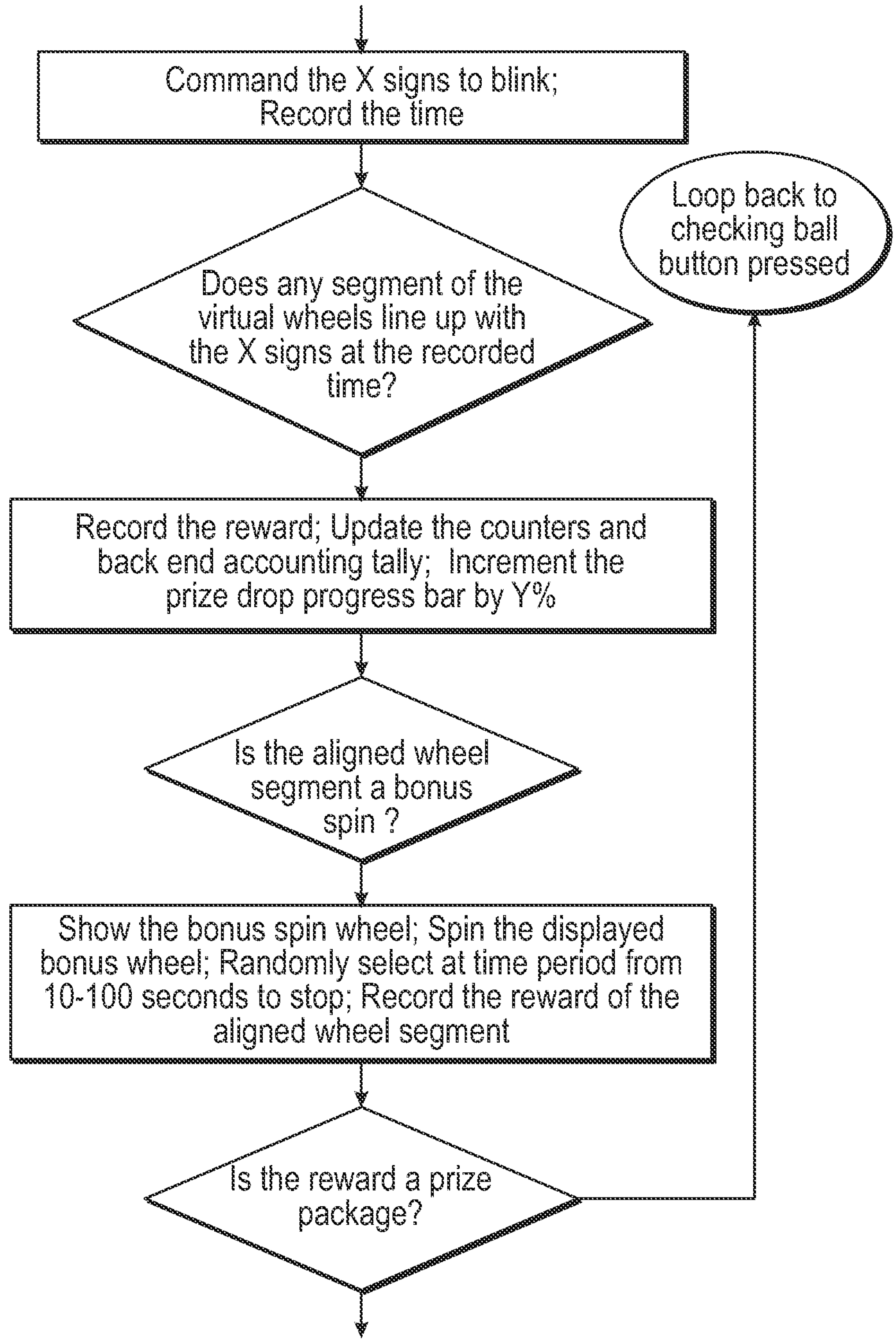
FIG. 18B continues to depict the next portion of the current invention's gameplay.
Figure 18C:
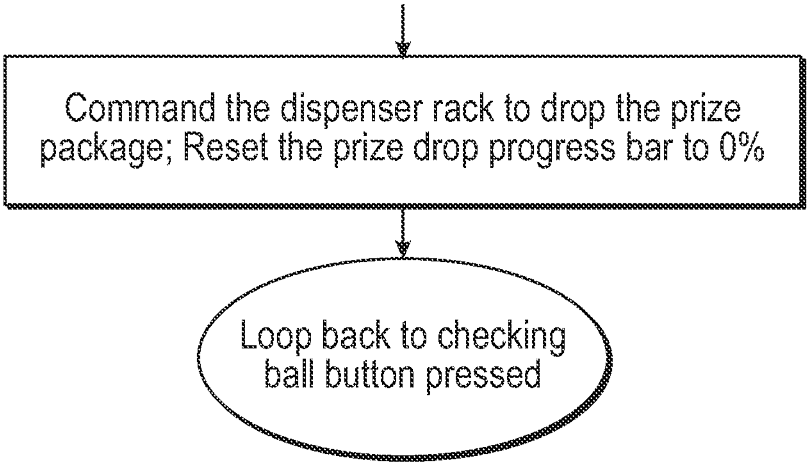
FIG. 18C continues to depict the last portion of the current invention's gameplay.

FIGS. 18A-18C disclose an exemplary gameplay of this invention. An arcade game machine of this invention comprises an external game control panel, as disclosed briefly in the description of FIG. 1, that in turn comprises a ball release button and a coin slot for deposited coins. This invention further comprises an internal circuit board, a microprocessor, and a GPU (Graphics Processing Unit), that, together, control all the electronic and mechanical components in the game machine, such as the display screen, the Ferris wheel, the sensor, the game counters, the lights, the music, etc.

FIG. 18A discloses that, to start a game, a player has to deposit a coin into the coin slot on the game control panel. The coin sensor and processor count and keep tally of the deposited coins. The processor then causes the ball purveyor to release a preconfigured number of balls per coin into the player's ball storage. It also sets, or increments for subsequent coins, the ball counter to the total number of balls the player has bought with the deposited coins and gained by hitting the ball rewards on the spin wheel. The balls bought or gained per game are cycled through an internal purveyor that comprises of tubes, a ferris wheel, a storage, mechanical gates, etc. The balls start out from the ball storage, are dropped down a hopper passing the sensor onto a flat tray. The balls are collected on the tray until a vertical sweeper board disposed across the width of the game machine and toward the back of the game machine, and continuously moving forth and back a short fixed distance to sweep and push the balls close in front of it, which, in turn, push the balls at the outer edge of the tray down a ball drop bin. This funnel bin is part of the ball purveyor system. The narrow end of the funnel is connected to a tube which is in turn connected to a ferris wheel. This ferris wheel brings the balls up and drop them in the player's ball storage to have them ready for the player to release them to continue playing the game.

FIGS. 18B-18C disclose that when a ball is dropped and crosses the sensor, the processor receives the signal and then causes the X sign's light to blink. Simultaneously, the processor checks if any sector of the spinning wheels aligned with the X signs at the moment. If they line up, the processor records the reward of the sector. The game has multiple rewards. If the reward is a number of prize tickets or balls, the processor adds the reward to the tally of the kind, respectively, and increments the Prize Drop progress bar by a preconfigured percent. If the reward is a prize package, the processor causes the dispenser's rack to push a package toward the front off the rack onto the flat tray. The packages are likely sit on the balls which have already lied on the tray. The player cannot get to the prize packages yet until the sweeper pushes the balls, and, indirectly, the prizes toward the edge of the tray into a pickup bin. The prize packages are designed to be quite larger than the balls so they cannot drop into the ball drop bin, and have to drop in the pickup bin. When the prize drops in the pickup bin, a sensor there alerts the processor to flash a 'Prize Drop' message, disclosed in FIG. 5, on the game display to alert the player, and to reset the Prize Drop progress bar to 0%.

It is contemplated that the two stage design of the current invention's gameplay is novel and makes the gameplay more enticing. In stage one of the game, a player tries to cause prize packages to drop, and, depending on his strategy, some balls too to fill the flat tray. The player can win this stage by releasing ball on the prize reward sectors of the virtual wheels. The game establishment can set the difficulty of the game, such as setting few prize reward sectors on the wheels, setting the wheel spinning speed, or setting one wheel for prize rewards and one wheel for ball rewards. Once the player achieves stage one of the game, when he gets enough prize packages on the flat tray and wants to pick them up, he needs balls to fill up the flat tray's surface so the sweeper can push the balls and prize packages sitting on the balls into the ball collecting funnel and prize pickup bin, respectively. In this stage two of the game, the player wants to focus on winning as many balls as he can by releasing the ball control button at the right time so the virtual ball would drop onto the ball reward sectors of the virtual wheels.

Figure 19:
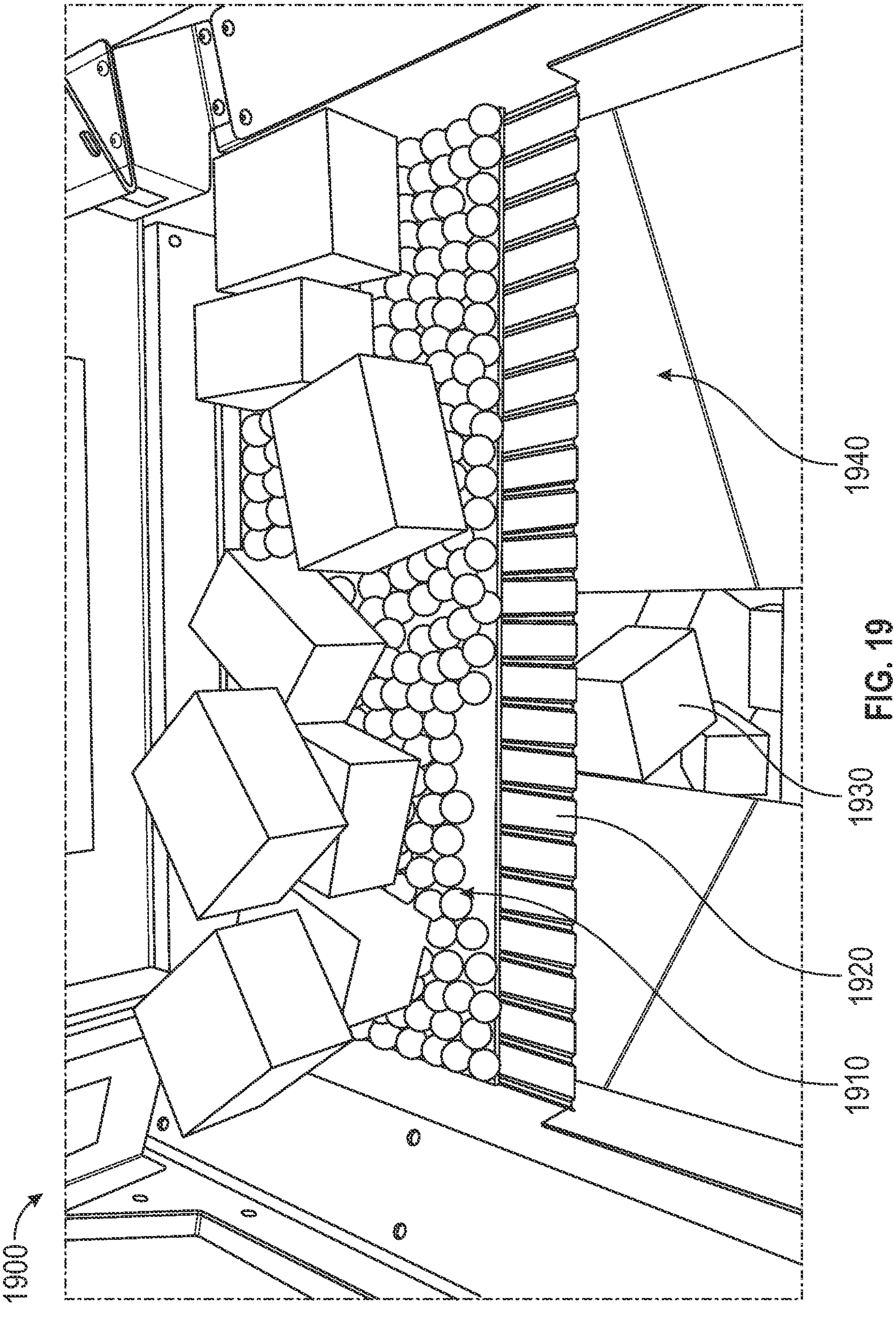
FIG. 19 depicts an embodiment of the current invention's important elements, such as the flat tray that released balls and prize packages sit on, and its elements.

FIG. 19 discloses another embodiment 1900 of the current invention's arcade game machine that further comprises a flat tray 1910 disposed below the color display screen, and above a ball collector funnel bin 1940 that is disposed on the bottom and toward the back of the arcade machine. Adjacent to the ball collector bin, a prize package pickup bin 1930 is disposed toward the front of the arcade machine so a player could pick up a prize package through the front opening. To separate the balls and prize packages, which both drop on the flat tray 1910, into the correct bins, a grate component 1920 is used and disposed to cover the entire opening of the ball collector bin 1940. The grate's gaps are only big enough for the balls to drop through, and, thus, the prize packages are pushed pass the grate 1920 toward the front, and drop into the prize package pickup bin 1930.

The invention claimed is:

1. A method of conducting a coin-operated arcade game system comprising:

- providing a physical see-through game box, an internal color game display, a hopper for ball dropping coupled with a hopper sensor for detecting said ball dropping, a microprocessor, a graphics processing unit (GPU), a memory component, a circuit board, an audio output device;
- providing an external game control panel that further comprises a coin input device operable to accept a coin from a player at said game box;
- providing a gameplay, that comprises a graphical interface that in turn comprises a left virtual wheel and a right virtual wheel, a left virtual X sign and a right virtual X sign, a prize drop progress bar, a prize ticket counter, a ball counter, a coin counter; wherein said microprocessor, said GPU, and said circuit board, together, control said gameplay;
- providing a prize package dispenser and a rack thereof;
- receiving a coin via said coin input device;
- initiating said gameplay, wherein said gameplay includes spinning said left and right virtual wheels;
- causing an internal ball purveyor to release a preconfigured number of balls per said coin into a ball storage;
- detecting that said ball release control button is pressed and releasing a ball down said hopper from said ball storage;
- detecting said ball drop via said hopper sensor and sending a ball drop signal to said microprocessor;
- commanding said left and right virtual X signs to blink in response to said ball drop signal;
- animating a virtual ball drop of a virtual ball on said graphical interface;
- commanding said left and right virtual wheels to send their sectors' data, including relative position to said left and right virtual X signs, respectively, in response to said ball drop signal;
- causing a prize win response in response to a prize win event when said virtual ball meets a sector of said left virtual wheel, said right virtual wheel, or both;
- providing a flat tray to catch a ball after its exiting said hopper and a prize package after it drops off said rack of said prize dispenser;
- providing a sweeper to push said ball outward toward said game box's front;
- providing a ball funnel to catch said ball after it drops off said flat tray;
- providing an internal ball purveyor to transport said ball to said ball storage;
- providing a prize pickup bin to catch said prize package after it drops off said flat tray;
- and further comprising, in response to a bonus spin prize win event of said left or right virtual wheel, superimposing a corresponding bonus spin virtual wheel over said virtual wheel, wherein all sectors of said bonus spin virtual wheel reward a prize.

2. The method of claim 1, wherein said bonus spin virtual wheel superimposes said left virtual wheel and presents multiple prize tiers including a grand, medium, or small prize.

3. The method of claim 1, wherein said bonus spin virtual wheel superimposes said right virtual wheel and presents preconfigured bonus prizes including a number of balls, a number of prize tickets, or a prize package.

* * * * *